No. 773,838. PATENTED NOV. 1, 1904.
M. J. WIGHTMAN.
THERMO ELECTRIC GENERATOR.
APPLICATION FILED JULY 13, 1900. RENEWED APR. 7, 1904.
NO MODEL. 3 SHEETS—SHEET 1.
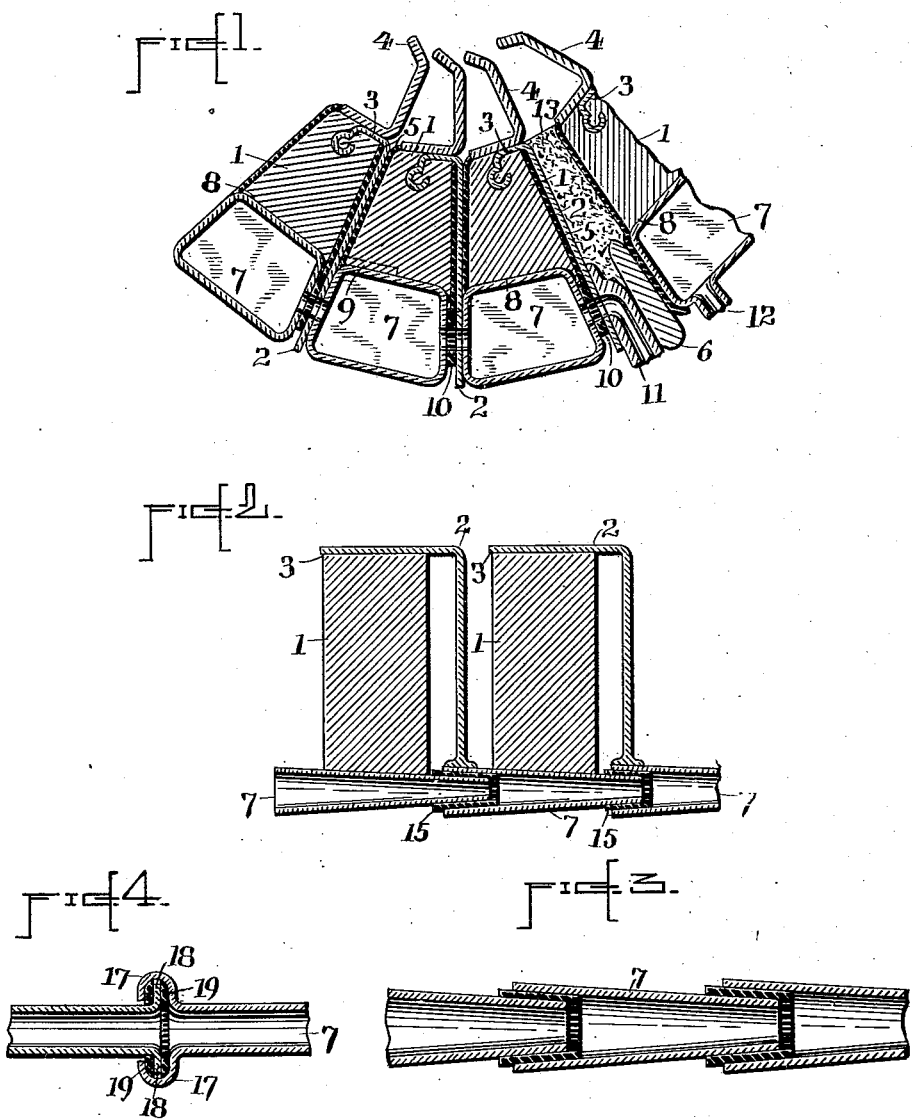
Witnesses:
Otto Greenberg
Ethel L. Lawler
Inventor
Merle J. Wightman
By
O. H. Townsend
Attorney

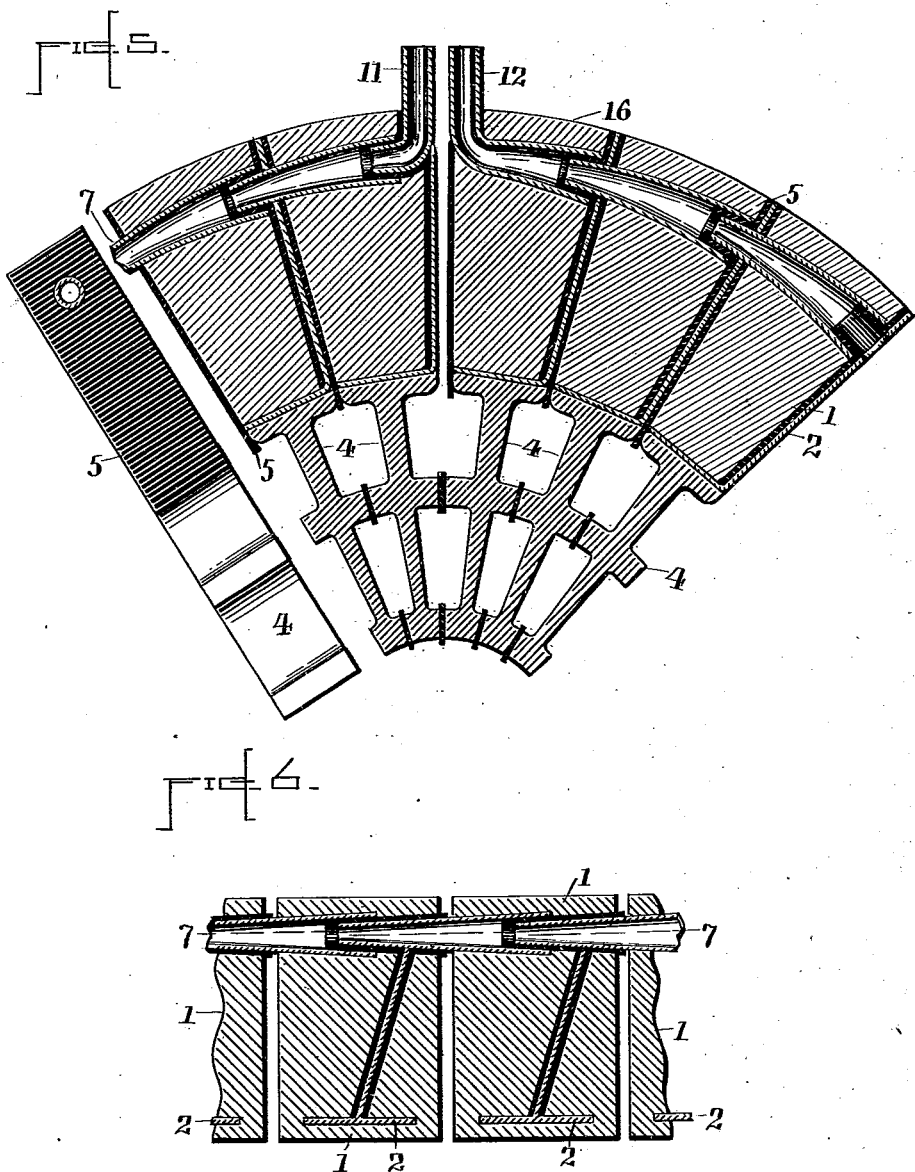

No. 773,838. PATENTED NOV. 1, 1904.
M. J. WIGHTMAN.
THERMO ELECTRIC GENERATOR.
APPLICATION FILED JULY 13, 1900. RENEWED APR. 7, 1904.
NO MODEL. 3 SHEETS—SHEET 3.
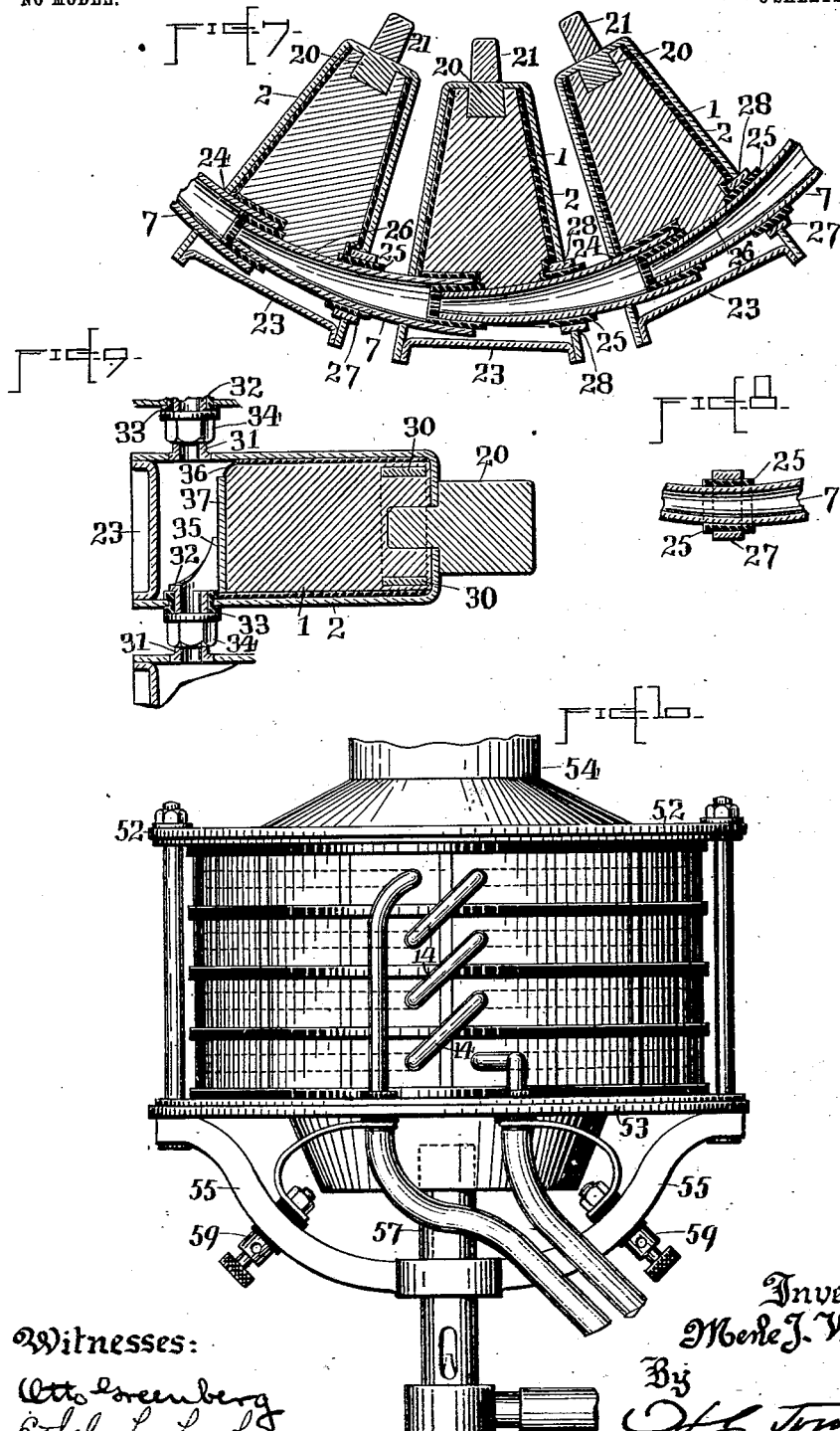
Witnesses:
Inventor
Merle J. Wightman
By
Attorney No. 773,838. Patented November 1, 1904.

UNITED STATES PATENT OFFICE.

MERLE J. WIGHTMAN, OF NEW YORK, N. Y., ASSIGNOR TO THE PYRO ELECTRIC COMPANY, OF NEW YORK, N. Y., A CORPORATION OF NEW JERSEY.

THERMO-ELECTRIC GENERATOR.

SPECIFICATION forming part of Letters Patent No. 773,838, dated November 1, 1904.

Application filed July 13, 1900. Renewed April 7, 1904. Serial No. 202,076. (No model.)

*To all whom it may concern:*

Be it known that I, MERLE J. WIGHTMAN, a citizen of the United States, and a resident of New York city, in the county of New York and State of New York, (post-office address Times Building,) have invented certain new and useful Improvements in Thermo-Electric Generators, (D. 1688,) of which the following is a specification.

The object of the present invention is to secure an efficient cooling at the cold junction or portion of couples comprising a thermoelectric pile.

A further object is to secure the above end by a cheap and simple construction.

As is well known, the electromotive force developed by any given thermocouple is, with few exceptions, proportional to the difference of temperature between the hot and the cold junction. Other things being equal, the electrical output and the efficiency of a thermocouple vary as the square of the electromotive force. It therefore follows that it is extremely important to maintain the temperature of the cold junction as low as possible. Especially is this true in practice where the hot temperature is limited by the melting-points of the metals used. This temperature does not exceed 400° centigrade with the metals found to give the greatest electromotive force for a given difference of temperature.

The usual method of cooling the outer junctions which has been heretofore followed in the design of thermopile is to surround the group of couples with a water-jacket which is insulated from the couples by a thin layer of cement, mica, or other good insulator. This thin layer, necessary for electrical insulation when the couple is designed for any great flow of current, becomes a barrier to the flow of heat, and I have found that it is impossible to maintain a low temperature with such construction.

In my improved method of cooling the couples of a thermopile I bring the water or other liquid in direct contact with the ends of the couples to be cooled and also arrange to have the water pass such junction in rapid motion, so that the heat is carried away as fast as it accumulates.

In carrying out my invention I preferably provide at that portion of the couple which is to be kept cool a hollow metal jacket, tube, or passage which is in direct metallic union or contact with the metal of the element to which it is attached, and being so metallically united practically brings the water into direct heat-conducting contact with said couple. Said jacket, tube, or passage may be of any desired form or material. Preferably it is a separate structure of some comparatively strong or tenacious material joined by brazing, soldering, or casting to the more friable metal of the element, although it might be formed in the material of the element itself, suitable inlet and outlet openings being provided for the supply and egress of a fluid or liquid of any kind caused to circulate through said jacket by pressure of the head of water or by a pump. Preferably, also, the water-space in each jacket, tube, or passage embraces the element of but one couple, and the said jackets, tubes, or passages are connected up into a continuous water duct or system in such manner that the mass of water shall not afford a ready shunt or short-circuit path between couples having a high difference of potential.

Some of the ways in which my invention may be carried out and some of the forms of pile to which it may be applied are illustrated in the accompanying drawings, in which—

Figure 1 is a partial horizontal section through one ring of a series of couples disposed around the central heating-flue in the usual manner. Fig. 2 is a section through two couples joined together and provided with a water-jacket of modified form. Fig. 3 shows in detail the manner of connecting up the tubular jackets of Fig. 2 to form the water-duct. Fig. 4 illustrates a modification in the water-tight insulating-joint. Fig. 5 shows in plan a portion of a ring made up from couples provided with tubular water-jackets of the form shown in Fig. 2. Fig. 6 shows the application of the water-cooling tube or jacket to a modified form of couple. Fig. 7 shows the manner of applying the cooling tube or jacket to a form of couple in which the heated junction is hermetically sealed from contact with the air. Fig. 8 is a detail showing the cooling-tube before it is applied to the couple, Fig. 7. Fig. 9 illustrates another modification in the manner of applying the cooling water-jacket. Fig. 10 illustrates in side elevation the complete thermo-electric generator.

In describing my invention I will assume that the two elements of each couple consist, as usual in the art, of a block 1 of some suitable alloy, as of zinc and antimony, and a strip or piece 2 of sheet metal of any other material—as, for instance, an alloy of nickel and copper—though any other substances could be used suitable for a thermocouple when heated at their junction 3. The two elements 1 2 make up the thermocouple herein referred to, and the junction between them where heat is applied may be formed in any desired way—as, for instance, in the manner indicated in Fig. 1, where the element 2 has its end inclosed in 1, the latter being cast around it. The element 1, which, as usual in the art, is the more readily fusible and friable element of the couple, may be provided with the heat-conducting metallic extension 4, brazed or riveted to said element or electrode 1, and may be of any desired form. The heating extension lies in the flue through which the flame or heated gases from the heating source pass, and said extension may be formed as shown, so that when the couples are assembled in a ring they will approximate one another and form the walls of heat-flues, as shown.

The element 2 is provided, as shown, on its opposite faces with a thin film or coating of mica, asbestos, or fireproof paint 5, which insulates it from electrical contact with the element or electrode 1, when the couples are assembled in a ring and pressed together by a wedge, as 6, inserted at any desirable point in the ring, but preferably at the point where the water-cooling duct, formed by the water-jackets, begins and ends.

The water-jacket for each couple is indicated by the numeral 7. Said jacket may be of any desired form and material and is in direct metallic union with the material of the element or electrode 1 at its outer or cool end. The jacket makes direct contact with said element over a greater or lesser superficial area, depending upon the form and manner of application of said jacket. In the present instance each jacket is shown of rectangular or box-like form and has an extended flat surface making contact with the outer plain surface of the electrode 1. The metallic union effected on this surface may be by casting or soldering of the two together at the plain surface 8, and each jacket is provided at opposite sides with passages or openings, one to form an inlet and the other an outlet duct, by which the cooling liquid or fluid may be circulated through said jacket. The metal jackets themselves are preferably made of copper, brass, or other metal more tenacious and less friable than that of the alloy electrode 1.

When the couples are assembled in a pile or electric series, each jacket, besides being in metallic union with one element of its own couple, is preferably electrically joined by soldering or otherwise to the element 2 of an adjoining couple, as shown, thus forming the electrical joint or union by which the couples are connected in series. Instead, however, of forming connection in this manner between the electrode 2 of one couple and electrode 1 of the adjoining couple it might be formed by carrying the outer end of electrode 2 directly into the mass of electrode 1, as indicated in dotted lines at 9. The preferable manner, however, is that already described.

When the couples are assembled as shown in Fig. 1, gaskets or washers 10 are provided around the adjoining openings of the jackets where they abut or come together, so as to form a water-tight joint and permit the liquid to be circulated through the connected series of jackets. These washers or gaskets should be of some insulating material in order to prevent the short-circuiting of the couples at their cold ends. It is preferable, however, though not necessary, to extend the sheet-metal element 2 out between the jackets, as shown, in which case it should be provided with a perforation or opening to register with the openings in the water-jackets. Being soldered to the jacket of the adjacent couple on the face which is exposed, a good joint against leakage is furnished at such point, while the gasket being preferably of some elastic material and subjected to pressure by the application of one or more wedges 6 in a horizontal row of couples completes the water-tight joint or union between adjoining jackets. Cold water or other fluid may be circulated through the jacket or jackets thus assembled or through them individually by means of a water-inlet pipe 11, connected to a head of water, and a water-egress pipe 12, as shown. Both of said pipes may be of metal and may form conducting-terminals of the couple or series of couples; but the ingress-pipe 11 should be soldered direct to electrode 2 and insulated from the jacket on the electrode 1 of the same couple. The pipe 12, also of metal, forming another electric and water terminal of the series, may be connected directly to its jacket, as shown.

When the couples have been assembled, a packing or luting of asbestos-cement or other suitable substance may be applied in the spaces 13 as indicated. The water circulates in the path leading through the ingress-duct 11 and through the series of water-jackets, following the general line of increasing or decreasing potential, and finally emerges by the exit-pipe 12, soldered to the jacket or element 1 of the last couple in the electric series. As those jackets which are at the points of greatest difference of potential in the series are farthest separated in the circulatory system, it is obvious that the path for shunting or short-circuiting of the current generated offered by the mass of water is kept at its greatest length in the generator. This manner of forming the circulatory system should be adhered to when another ring or couple is connected to the first—that is to say, the egress-pipe 12 should be connected to the ingress-pipe 11 of the next higher or lower ring, as the case may be, and as indicated in Fig. 10, where the generator is shown as made up of four horizontal rings or couples.

As shown in Fig. 2, the jacket may take the form of a round tube 7, which is preferably tapered, as shown, to permit the ends of adjoining tubes or jackets to be inserted the one within the other to form a continuous water-duct or circulatory system at the point where the tubes fit together and there insulated by a gasket or collar 15, of mica or other insulating material, the joint being made water-tight by driving or forcing the tapering end of one jacket or tube into the expanding end of the adjoining tube.

Each jacket may be of copper or other good heat-conducting metal and may be soldered or cast directly to the element 1 of one couple and is electrically joined by preference with the element 2 of the adjoining couple by soldering or otherwise, so as to become, in effect, a part of each thermocouple and to constitute the path for the electric current for the series of couples.

When the couples are arranged in horizontal layers, the tubular metallic jacket of the couple at one end of the series may be one terminal of the electric series, while the ingress-tube 11, as shown in Fig. 5, may be connected directly to the element 2 and form the opposite electric terminal.

The heating metallic extensions for the couples are formed in Fig. 5 in such manner that when the couples are assembled in rings or several rings placed one above the other, as indicated in Fig. 10, they will form two concentric rows of flues or ducts through which currents of heating air or gas may be circulated upward through one ring of ducts and downward through the other, so as to equalize the heating of the couples which lie in different positions vertically, and therefore at different distances from the original heating source. This manner of equalizing the heating of the couples is not herein claimed, as it forms the subject of claims in another application for patent filed by me April 8, 1901, Serial No. 54,801.

In practice the jackets or tubes 7, with the elements 2 attached to them, are assembled in a complete ring, the elements 2 being provided with an insulating enamel or coating of fireproof paint and the heating-terminals 4 attached by brazing or riveting. The skeleton thus formed, with the inlet and exit tubes 11 and 12 attached, would then be placed in a suitable mold, and the metal or alloy constituting the electrode 1, melted, would be poured into the mold and attach itself to the tubes and make contact with the element 2 at the inner or heated end, heated from extensions 4. The mold may be of such dimensions that the electrodes 1 will completely encompass the tubes or jackets 7, as indicated in Fig. 5, where the circular line 16 indicates the outer end of the electrodes 1.

Fig. 4 shows another way of making a water-tight insulated joint between the tubular jackets. In this instance a flange 17 on one end of each tube is folded over and crimped down upon the similar flange 18 at the opposite end of an adjoining tube. The washers 19 afford insulation and complete the water-tight joint.

Fig. 6 shows the cooling-jackets applied to a couple in which one element, 1, is cast completely around the element 2, the latter being provided, as indicated by the heavy line, with an insulating-coating of refractory substance. The end of the element 2 which is nearest the heated end of the electrode 1 is spread out, as indicated, to afford a large contact-surface. By casting the element 1 on the more readily oxidized element 2 the latter is kept to some extent from contact with the air, and thereby prevented from oxidizing at the point or surface where it is electrically joined to the element 1.

Fig. 7 shows the cooling-jacket as applied in the form of a tube to a couple in which the one element consists of a casing of some hard and dense alloy inclosing the other or more readily fusible and friable electrode or element and hermetically sealed, so as to prevent oxidation of the joint between said elements at the heated portion.

The element 2 may be an alloy of nickel and copper or other material which is hard and dense and is formed, as shown, in the shape of a cup or receptacle, into which the alloy 1 may be poured. The inner surface of the element 2 is provided, except at its bottom or point where an electric junction is to be formed with the element 1, with a coating of refractory insulating material, as well understood in the art. It may also be provided with the inwardly-extending lug 20 to increase the contact-surface and with a central heating extension 21, attached to it and heated by flame or current of hot gases.

23 is a cap or cover for the electrode 2. The cover 23 is soldered at its edges to the edge of the electrode 2 to form a hermetically-sealed joint. The tapering tubes 7, constituting a water-jacket, are soldered directly to the walls of the electrode 2 at the point 24, where they pass through one side of said electrode, and at the other side are insulated from said electrode by a washer or bushing 25, of insulating material. They may be in electrical connection with the material of the electrode 1 at the surface 26 by casting the metal 1 upon them after the tubes have been assembled or attached to the cup-shaped electrode 2, or the electrode 1 may be cast to the desired height in the cup and the metal tube 7 afterward inserted and soldered.

To make a hermetical joint at the point where the tube 7 is inserted from the cup 2, the washer 25, which may be of mica or other suitable material, is placed in position upon the tapering outer surface of the tube, as indicated in Fig. 8, and the metal washer or collar 27 then driven down over the insulation to form a tight joint between the inner surface of the ring or washer and the outer surface of the tube. When the tube is placed in position in the opening in the cup, the outer surface of the ring or collar 27 is soldered directly to the metal of electrode 20, (indicated at the point 28,) thus completing the hermetical sealing of the cup.

As will be obvious, the insulating-lining of the cup 2 should be continued around over that end of a cooling-tube 7 which is in metallic union with the metal of the electrode 2, while that end of a tube in any couple which is joined to the electrode 2 of the next couple is exposed for electrical union with the metal 1. When the liquid is circulated through the connected system of tubes, the jacket for each element 1 is made up, as will be seen, in part of one end of the tapering tube which is metallically joined to the element 2 of the same couple and in part of one end of the tube which is metallically joined to the element 2 of the next couple in the electric series.

Fig. 9 shows another manner of applying the cooling-jacket. In this case, as before, the cup-shaped electrode 2 is provided with a projection 20 to form an extended surface of contact with electrode 1 near the heated end and also with the heating extension already referred to. There is also provided in this case a rigid ring 30, of steel, set into the electrode 1 around the projection 20, so as to effectually resist the tendency to expansion of the parts within said ring 30, thereby causing the contact-surfaces between the extension 20 and the material of the electrode 1, which surfaces lie in planes transverse to the lines of expansion, to be pressed firmly together. This compression or tightening of the junction or electric connection formed from one electrode to another will actually lower the resistance when the heat is applied to the couple and will more than offset the natural increase in resistance to which all metals are subject by an increase of temperature. By this expedient also the difficulties met with in thermo-electric couples from the loosening of the joint or union through repeated heatings and coolings are effectually removed and a good electrical contact is always insured.

It will be observed that the heating effects are applied at the center or near the center, so that the ring 30 will be naturally less exposed to heat. The action, in fact, depends upon the difference in expansion of the ring 30 and the parts contained within the same, said difference being either the natural difference of the coefficient residing in the materials themselves or being brought about artificially to a sufficient extent by so locating the ring 30 or by artificially cooling it, so that it shall be very much less heated than the parts within it, or the action may be a combination of the two actions.

The water-jacket is formed at the outer end of the couple in part by the walls or cover 23 of the cup-shaped or hollow electrode 2 and in part by the outer end or surface of the block electrode or element 1. The egress and ingress ducts or terminals for the water or cooling liquid consist of the brass or copper castings 31 32. Casting 31 is soldered or metallically united at one end with the metal of electrode 2 for one couple, and casting 32 is provided at the point where it passes through the electrode 2 for union with the adjoining couple with an insulating washer or gasket 33, as clearly shown, which may be compressed by the nut 34, so as to afford a good water-tight joint as well as electrical insulation at this point. Each copper casting or coupling 32 is provided with an extension 35, adapted to be electrically joined with a plate 37, of copper or other conducting material and of considerable surface area, which is applied to the outer face of the element 1 and soldered thereto for the purpose of affording a good electrical connection from the same to the coupling, by which it is electrically joined to the opposite element of the next couple. When the jacket is formed in this manner, suitable provision is made for preventing the water from reaching the junction at the inner or heated end of the couple.

36 indicates waterproof paint or japan coating applied to the exposed surface of the electrode 1, as shown, to prevent the water from passing down between the electrode 1 and inner surface of the electrode 2. The application of this sealing-coat of paint is rendered necessary by the fact that the insulating-coating upon the inner surface of the electrode 2 is rendered more or less porous by the heat of the alloy forming the electrode 1 when the latter is turned into electrode 2.

Fig. 10 shows how any of the couples may be built up into a thermo-electric pile or generator and the circulatory system for the cooling liquid established without danger of short-circuiting through the liquid, although a large number of couples may be connected in series.

In this figure four circular rows or layers of couples are shown assembled. Each layer is joined to the next by connecting-tubes 14, which convey the water and may at the same time furnish the electrical connection from the positive terminal of one layer to the negative of the next. The connecting-tubes might be of insulation if it be desired to make a different electrical connection from that afforded when the water-tubes complete the electrical circuits between the above layers, and said layers are connected in series with one another. The several layers are assembled and insulated in the well-known manner from one another and are clamped as usual in the art between the two heads 52 and 53, the upper one of which is provided with a chimney 54, while the lower is supported upon a frame 55. A burner—as, for instance, a gas-burner—supplies heat to the space at the interior of the pile, as indicated at 57. The binding-posts forming electrical terminals of the generator are indicated at 59. They are electrically united with the metal tubes forming the inlet and exit tubes for the series of water-jackets, although, as will be well understood, the electrical connections might be independent of the circulatory system in whole or in part throughout the generator. In the latter case, as will be obvious, insulation must be provided at the proper points, as will be well understood by electricians.

I claim as my invention—

1. In a thermo-electric battery a series of couples each provided with a water-jacket in direct contact with the metal of the element said jackets being connected to form a circulatory duct in which the fluid may flow in the general direction of the fall or rise of electromotive force, as and for the purpose described.

2. A thermo-electric couple having its more fusible element provided with a metal water-jacket in direct metallic union with said element.

3. A thermo-electric couple having a hollow cooling-jacket in direct metallic union with an element of said couple.

4. In a thermo-electric battery, a couple provided with a water-jacket in direct metallic union with one element of said couple and with the opposite element of another couple.

5. In a thermo-electric battery a series of couples each having an element provided with a water-jacket in direct contact with the metal of the element the jackets of adjacent elements being connected to form a duct or circulatory system for the cooling fluid.

6. In a thermo-electric battery an element provided with a cooling water-jacket consisting of a tube attached or cast to the element and projecting therefrom for coupling with the tube of an adjoining couple.

7. In a thermo-electric battery a series of couples each having an element provided with a tapered tube adapted for union with the tubes of adjoining couples to form a circulatory duct for a cooling liquid.

8. In a thermo-electric battery a closed water-jacket adapted to contain a liquid or fluid which shall be in direct contact with the metal or element and provided with entrance and exit ducts whereby the liquid or fluid may be forced to rapidly circulate through the same for the purpose of more effectually cooling the element.

9. In a thermo-electric battery, a series of metal water-jackets connected with one another through insulating couplings or joints as and for the purpose described.

10. In a thermo-electric battery a series of thermo-electric couples each having a cooling-jacket in direct metallic union or contact with an element of each couple said jacket being connected in a circulatory system for the water or other cooling fluid through insulating couplings or joints.

11. A series of wedge-shaped thermo-electric cells provided with metallic extensions having flanges disposed to form a circular tier having a central opening and outer circles of openings formed by the juxtaposition of said extensions, substantially as described.

12. A plurality of thermo-electric cells each provided with a conduit for conveying a current of refrigerating fluid through the substance of the cell, and means for coupling said conduits to allow said fluid to proceed through said cells successively, substantially as described.

13. In a thermopile, a plurality of couples arranged in series having a plurality of tubes therein in alinement with each other and washers interposed between the couples for forming a continuous duct for the passage therethrough of a cooling medium.

14. A thermo-electric cell provided with means for conducting a current of refrigerating fluid through its interior.

15. A thermo-electric cell containing a joint to be heated, a joint to be cooled and tubes of conducting material electrically connected respectively with said joints but insulated from one another and adapted to convey a current of refrigerating fluid in proximity to the joint to be cooled.

16. A thermo-electric cell provided with a heating-piece adapted to produce flues, when a plurality of cells are assembled in tiers.

17. A battery of thermo-electric cells arranged in tiers and provided with heating-flues and circulating-tubes.

18. A thermo-electric cell having circulating-tubes for conducting a refrigerating fluid through its interior; the said tubes also acting as circuit-terminals for the connection of two or more of said cells in battery.

19. In a thermo-electric couple an expansion-resisting ring or envelop encompassing or encircling the junction and adapted as described to resist the tendency of the parts to expand so as to cause the contact connection between the elements of the couple to be tightened when the couple is heated.

20. In a thermo-electric couple an expansion-resisting ring or envelop surrounding the parts at the heated portion of the couple and adapted to cause the tightening of the joint when the couple is heated.

21. In a thermo-electric couple an expansion-resisting ring or envelop having one of the elements within it.

22. In a thermo-electric couple, an expansion-resisting ring combined with concentric elements contained within it.

23. A thermo-electric couple having an automatically-tightened contact connection between the elements at the heated portion of the couple acting by the difference of expansion of two metals subjected to the heat applied to the couple.

24. A thermo-electric couple having the joint or contact at the heated portion of the couple inclosed in a hermetically-sealed casing composed of one of the electrodes in combination with a sealing material applied where the inclosed element makes contact with the insulated material between itself and the inclosing element, as and for the purpose described.

25. A thermo-electric couple in which one of the elements constitutes a hermetically-sealed inclosure for the other and is provided at its cooler end with a water-conducting space and with entrance and exit ducts passing through the walls of the inclosing element.

26. A thermo-electric couple having the more readily fusible element cast within a hermetically-sealed cup or receptacle formed of a metal constituting the opposite element and provided with a liquid or fluid conveying pipe in electrical union with it, as and for the purpose described.

27. In a thermo-electric couple an element constituting an inclosure for the other element of the couple and having an extended electrical contact therewith by means of a reentrant projection or extension.

28. In a thermo-electric couple an element constituting an inclosure for the opposite element or electrode and having an extended or enlarged connection therewith through an axial projection and an expansion-resisting ring surrounding said projection as and for the purpose described.

29. A thermo-electric couple in which one element is of cup shape or other form to adapt it to form a receptacle or inclosure for the other and is furnished at its outer or cooler ends or portion with entrance and exit ducts to permit a cooling fluid to be circulated through the spaces between the inclosed metal and the inclosed end of the receptacle.

30. A thermo-electric cell an element of which is provided with a tubular passage for a cooling medium.

31. In a thermo-electric cell the cooling tube or passage passing through the material of both elements but insulated from one of them.

Signed at New York, in the county of New York and State of New York, this 6th day of July, A. D. 1900.

MERLE J. WIGHTMAN.

Witnesses:
D. H. DECKER,
E. L. LAWLER.